(12) United States Patent
Gormley et al.

(10) Patent No.: US 8,824,289 B2
(45) Date of Patent: Sep. 2, 2014

(54) SYSTEM AND METHOD FOR AUTONOMOUS DISCOVERY OF PEAK CHANNEL CAPACITY IN A WIRELESS COMMUNICATION NETWORK

(75) Inventors: Eamonn Gormley, Redmond, WA (US); Jeffrey Paul Harrang, Sammamish, WA (US); David B. Gibbons, Redmond, WA (US)

(73) Assignee: Opanga Networks Inc., Seattle, WA (US)

( * ) Notice: Subject to any disclaimer, the term of this patent is extended or adjusted under 35 U.S.C. 154(b) by 101 days.

(21) Appl. No.: 13/287,643

(22) Filed: Nov. 2, 2011

(65) Prior Publication Data

US 2012/0106383 A1    May 3, 2012

Related U.S. Application Data

(60) Provisional application No. 61/409,523, filed on Nov. 2, 2010.

(51) Int. Cl.
*H04L 12/26* (2006.01)
*G06F 11/34* (2006.01)
*H04W 24/02* (2009.01)

(52) U.S. Cl.
USPC ........... 370/231; 370/235; 370/252; 370/328; 709/223; 709/235; 455/423; 455/452.2; 455/453; 455/67.11

(58) Field of Classification Search
USPC .......... 370/252, 253, 328, 229–240; 455/423, 455/452.2, 453, 67.11; 709/223, 235
See application file for complete search history.

(56) References Cited

U.S. PATENT DOCUMENTS

| 8,031,722 | B1 * | 10/2011 | Sanville et al. ............. 370/395.7 |
| 2007/0081462 | A1 * | 4/2007 | Gefflaut et al. ............... 370/235 |
| 2007/0086353 | A1 | 4/2007 | Gefflaut et al. |
| 2008/0039058 | A1 * | 2/2008 | Ray ............................ 455/414.3 |
| 2009/0141650 | A1 | 6/2009 | Balan et al. |
| 2012/0092995 | A1 * | 4/2012 | Arvidsson et al. ............ 370/235 |

* cited by examiner

*Primary Examiner* — Alpus H Hsu
*Assistant Examiner* — Walter Divito (57) ABSTRACT

A wireless device includes a data structure that relates peak channel capacity to the quality of the wireless communication link. The wireless communication link quality forms an index to indicate the expected peak channel capacity for that particular quality value of the wireless communication link. The wireless device uses the data storage structure to determine an expected data transfer throughput based on the quality of the wireless communication link. A transfer rate lower than expected may indicate congestion in the core network or the RAN. In this case, the network may slow the data delivery from the data source or temporarily suspend delivery. Conversely, low data throughput may be the result of a poor quality wireless communication link. If the data structure indicates that the data throughput corresponds to the expected throughput for the quality value of the wireless communication link, the system need not take any steps to reduce congestion.

17 Claims, 9 Drawing Sheets

SYSTEM AND METHOD FOR AUTONOMOUS DISCOVERY OF PEAK CHANNEL CAPACITY IN A WIRELESS COMMUNICATION NETWORK

BACKGROUND OF THE INVENTION

1. Field of the Invention

The present disclosure is directed to a system and method for autonomous discovery of peak channel capacity in a wireless communication network and, more specifically, to techniques for a wireless communication device to independently discover the peak channel capacity of a radio link coupling it to a communication network.

2. Description of the Related Art

Wireless communication networks comprise a radio access network (RAN) and a core network (CN). Although different terminology may be used for different systems, the RAN is generally the portion of a telecommunication network that communicates with wireless communication devices, sometimes referred to as user equipment (UE), mobile station (MS), mobile device or the like. For purposes of the present discussion, the terms RAN, UE, MS, and the like may be used interchangeably with other similar terms describing the same functionality.

While the RAN includes the radio link between a base station and the wireless communication devices, the CN may be implemented in a variety of fashions. The CN may include microwave or other wireless links. It typically also includes fiber optics, hardwire connections and the like.

Downloading a data file from the CN to a wireless communication device is a common activity. The data file may be, by way of example, a multimedia file. Files of this type are often quite large and present the real possibility of causing congestion in the communication network. When a wireless communication device requests a data file, the wireless communication device has little control over the rate at which the data file is transferred. A slow data transfer rate may be the result of a poor radio link between the base station and the wireless communication device. Alternatively, the slow data transfer rate may be result of congestion in the CN or at the RAN. Congestion at the RAN may occur, for example, if the base station is communicating with a large number of devices and response times are slow.

In an effort to avoid congestion of the communication network, a network control element may instruct the data source (e.g., a server) to slow down the data transfer rate to avoid the undesirable congestion. As noted above, the slowed data transfer rate may be a result of a poor radio link or actual network congestion. If the slow data transfer rate is the result of a poor radio link, sending a command to the data source to slow down the transfer rate does not relieve congestion in the network and does not improve over all data throughput. On the other hand, if a slow data transfer rate is the result of network congestion, sending a back-off command to the data source can relieve network congestion. Thus, those skilled in the art will appreciate that it is important to determine the cause of the low data transfer rate. The present invention provides this and other advantages, as will be apparent from the following detailed description and accompanying figures.

DETAILED DESCRIPTION OF THE INVENTION

The present disclosure is directed to a system and method whereby an individual wireless communication device measures a quality value related to the quality of the radio signal connecting the device to a base station. For a particular signal quality level, an associated peak capacity value is determined for that communication link. Similar measurements are performed at other quality signal level values to construct a table or other data storage structure that can equate the quality of the radio link with a maximum data throughput capacity.

Once such a table is constructed, the wireless communication device, in a subsequent communication, can determine the expected data throughput capacity based on the current quality of the radio link. If the actual transfer rate is below the expected throughput capacity, it may be presumed that the slow data transfer rate is the result of congestion. Alternatively, if the data transfer rate is at or about the expected data transfer rate for the quality value of the radio link, there is no congestion in the communication network and there is nothing that can be done to improve the date transfer rate until the quality of the radio link improves.

As discussed above, this is a critical distinction. Prior art systems sometimes identify congestion simply on the basis of a low data transfer rate. However, the low data transfer rate can be caused by actual congestion in the network or by a poor radio link. If one assumes that a low data transfer rate is due solely to network congestion, the network may be instructed to slow down its transfer to avoid network congestion when, in fact, none exists. A poor quality radio link is not equivalent to network congestion.

Figure 1:
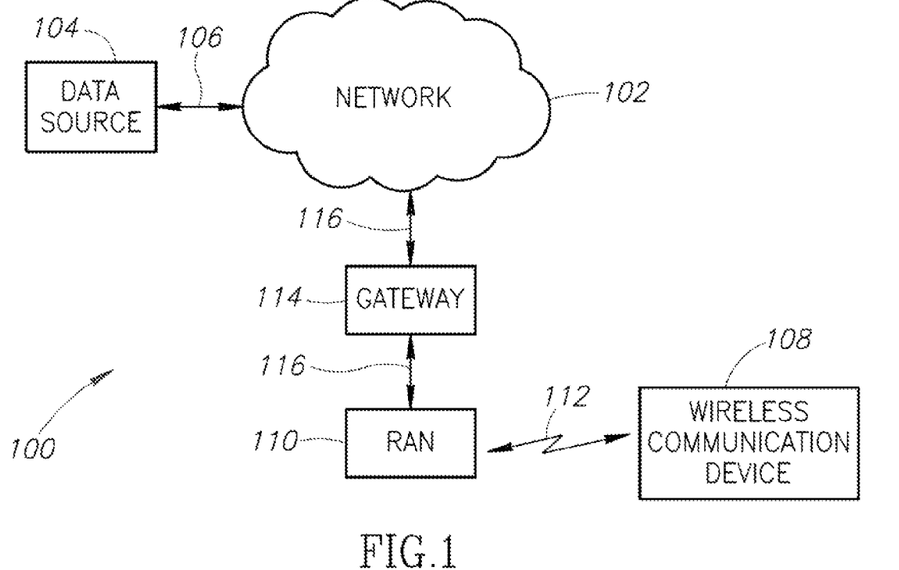
FIG. 1 illustrates a system architecture used in the implementation of the present disclosure.

FIG. 1 illustrates a system 100 in which a network 102 is shown in simplified form. The network 102 may be a private core network, such as is typical with a telecommunication network service provider. Alternatively, the network 102 may include a portion of a wide area public network, such as the Internet. In FIG. 1, a data source 104 is illustrated as coupled to the network 102 via a communication link 106. The data source 104 contains a data file to be transferred to a requesting device via the network 102. As illustrated in FIG. 1, a wireless communication device 108 will request the data file from the data source 104. The wireless communication device 108 may be any form of known communication devices ranging from mobile computing devices, such as a laptop computer, computing tablet, iPad™ or the like. The wireless communication device 108 may also be a Smartphone or other known form of communication device capable of receiving and processing a data file received from the data source 104.

The wireless communication device 108 is coupled to a radio access network (RAN) 110 via a wireless communication link 112, which may be referred to herein as a radio link. It is the quality of the wireless communication link 112 that will be the primary focus of the present disclosure.

The RAN 110 is coupled to the network 102 via a gateway 114 and various communication links 116. For the sake of clarity, other conventional network components, such as firewalls, routers, and the like are omitted from FIG. 1.

Figure 2:
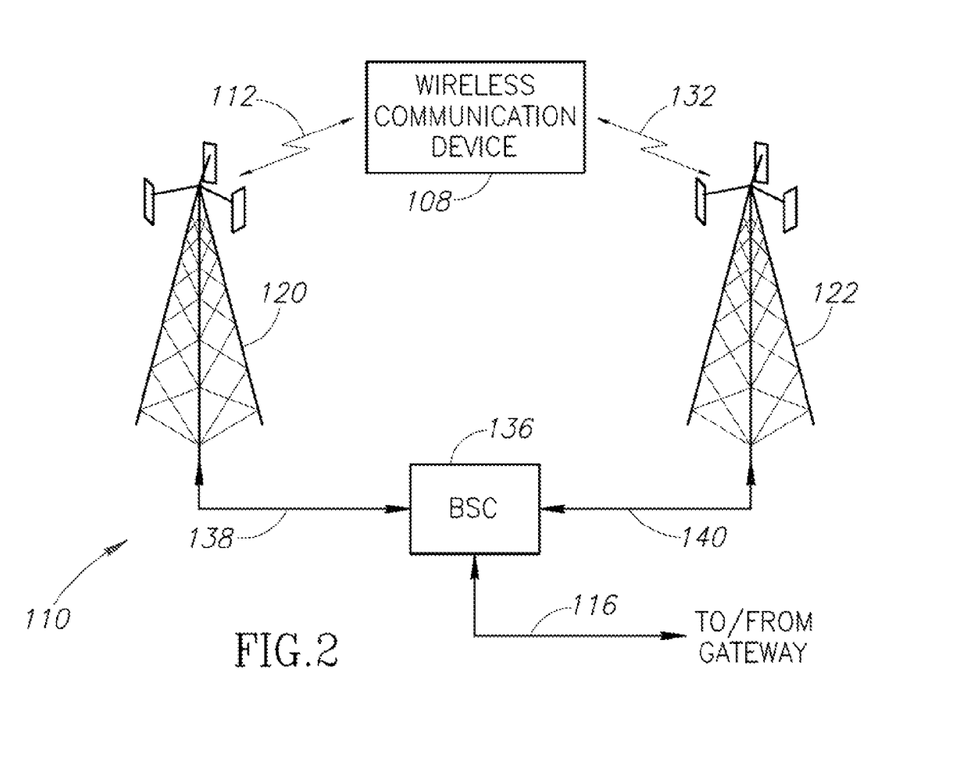
FIG. 2 is illustrates the operation of a radio access network and multiple base stations constructed in accordance with the system of FIG. 1.

FIG. 2 provides additional details of the RAN 110 and illustrates a base station 120 and a base station 122. Each base station (e.g., the base stations 120-122) has an area of coverage 124, illustrated in FIG. 3. As those skilled in the art will appreciate, the area of coverage 124 may vary somewhat based on the transmitter power in the base station, the overlap in coverage with other adjacent base stations, and barriers (man-made or natural terrain) that may block certain areas of coverage. In addition, the area of coverage 124 is typically subdivided into cell sectors or other sub-cells, such as the sectors 126-130 illustrated in FIG. 3. Those skilled in the art will appreciate that the location of the wireless communication device 108 in close proximity with the base station 120 will generally provide a better quality signal than if the wireless communication device 108 is located at an edge of the area of coverage 124 at some distance from the base station 120. As will be discussed in greater below, signal quality may be adversely affected by the distance from the base station to the wireless communication device, or by blockage of the signal by terrain or man-made structures. In addition, the quality of the wireless communication link 112 may be adversely affected by interference and other noise sources.

Returning to FIG. 2, it should be noted that the wireless communication device 108 is illustrated as communicating with the base station 120 via the wireless communication link 112 and communicating with the base station 122 via a wireless communication link 132. In operation, the wireless communication device 108 can sometimes communicate with multiple base stations simultaneously. Alternatively, FIG. 2 can functionally illustrate the operation of the system 100 as the wireless communication device 108 moves out of range of the base station 120 and into range of the base station 122, as is common with mobile wireless communication devices. As the wireless communication device moves further away from the base station 120, the quality of the wireless communication link 112 will generally decrease. Conversely, the quality of the wireless communication link 132 will generally increase as the wireless communication device 108 moves closer to the base station 122.

The base stations 120 and 122 are communicatively coupled to an optional base station controller (BSC) 136 via communication links 138 and 140, respectively. Depending on the particular system implementation, the BSC 136 may control only a single base station or may control a greater number of base stations. The communication links 138-140, as well as the communication link 116, may sometimes be referred to as a backhaul coupling the base stations to the network 102 (see FIG. 1). (Some networks, such as LTE, can be implemented without the BSC 136.)

With a general description of the architecture of the system 100, various ways of measuring the quality of the wireless communication link 112 may now be discussed in greater detail.

RF Signal Metrics

There are several RF Signal Metrics that could potentially be used to estimate the peak possible throughput on a wireless channel. The metrics examined herein are received signal strength index (RSSI), carrier to interference plus noise ratio (CINR), and channel quality index (CQI).

The factors that influence the rate at which a wireless device can receive data include the following:

Received Signal Strength Indication (RSSI)

At first glance it would appear that the RSSI should be a good indicator of the instantaneous throughput possible on a wireless channel. It would be expected that the stronger the wireless signal received from the serving base station at the mobile device, the better the throughput should be.

This is true only in the case where there is no co-channel interference. When there is co-channel interference present in the network (as is usually the case in cellular wireless networks), then this will reduce the possible throughput.

If an assumption of no interference is made then the RSSI can be used in combination with a thermal noise power estimate to generate a signal to noise ratio (SNR) estimate that can be used in lieu of a CINR reading.

$$SNR = \frac{RSSI}{Thermal\ Noise\ Power}$$

If there is no interference present, this SNR can then be mapped to a peak instantaneous throughput. However if interference is present, the throughput estimated from the SNR mapping will be higher than the peak throughput the channel is physically capable of achieving at that time.

Carrier to Interference plus Noise Ratio (CINR)

The CINR is perhaps the best indicator of the achievable throughput in a wireless system. The CINR is defined as follows:

$$CINR = \frac{Received\ Power\ from\ serving\ Base\ Station}{Interference\ Power + Noise\ Power}$$

where:
The received power from the serving base station is the signal level seen at the mobile device from the serving base station. Depending on the particular wireless technology, the receive power may be:
  Total power received from the serving base station (e.g., as in GSM)
  Power on reference signals from the serving base station (e.g., as in LTE, WiMAX)
  Power on a CDMA code (e.g., as in W-CDMA, CDMA2000, HSDPA, 1xEV-DO, etc.)
The interference power is the amount of signal received from other base stations in the wireless network that are operating on the same frequency channels as the serving base station
The noise power is power of the thermal background noise received at the mobile device
Throughout this document we use the term CINR in a generic fashion. It should be noted that the terminology used for a serving signal power to interference signal power ratio can be vary depending on the wireless technology under discussion.
  In CDMA networks, the value Ec/Io (received power per chip divided by interference power spectral density) is used as the CINR.

In LTE networks, a CINR value is not reported. Instead a related ratio, the RSRQ (Reference Signal Received Quality), is reported from the mobile devices to the base station.

Mapping Between CINR and Throughput

Here we present some examples of the mapping between CINR and throughput for several technologies. These mappings are based on published graphs and tables and can be used in algorithms for estimating peak channel throughput from a CINR metric.

Figure 4:
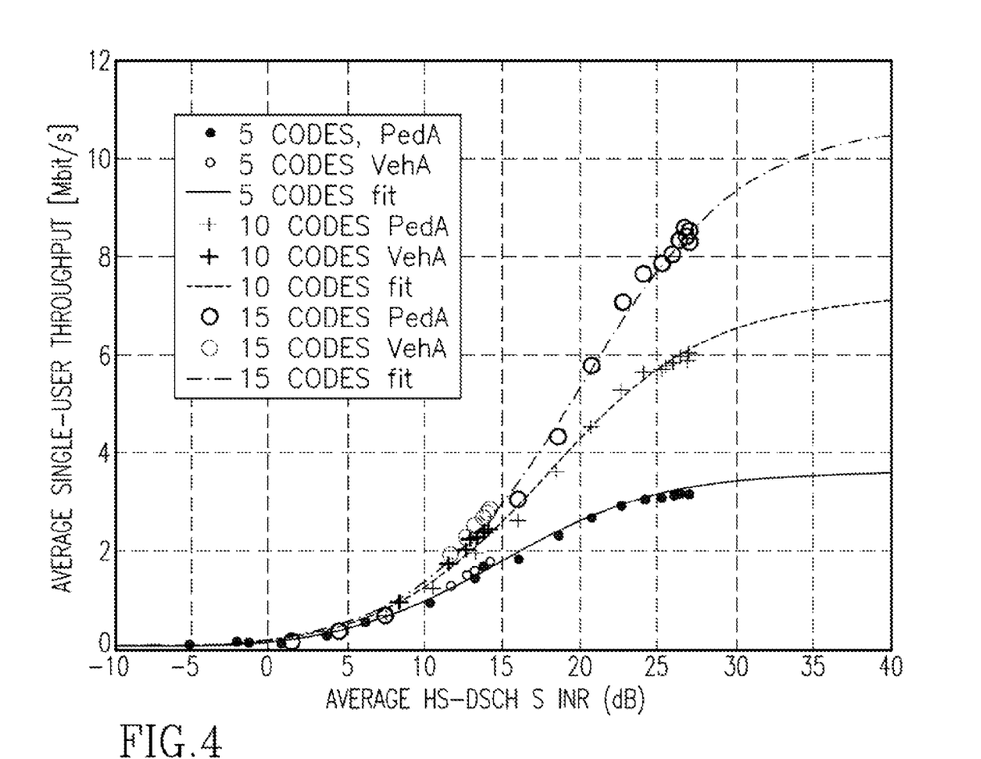
FIG. 4 is a graph illustrating a data throughput for a single user, using multiple codes.

FIG. 4 (from (Holma & Toskala, 2006)) shows a plot of the signal to interference plus noise ratio (SINR) on the High Speed Downlink Shared Channel (HS-DSCH). The peak throughput in this case is 10.7 Mbps, consistent with the performance of Rel. 5 HSDPA. Similar plots can be obtained for Rel. 6/7 HSDPA. The data from FIG. 4 is shown in tabular form in Table 1 below.

TABLE 1

HSDPA performance table: data rate (Mbps) dependence on SINR for various numbers of codes

| SINR (dB) | Number of Codes | | |
|---|---|---|---|
| | 5 | 10 | 15 |
| −10 | 0.05 | 0.05 | 0.05 |
| −5 | 0.1 | 0.1 | 0.1 |
| 0 | 0.2 | 0.2 | 0.2 |
| 5 | 0.5 | 0.6 | 0.6 |
| 10 | 1.0 | 1.2 | 1.3 |
| 15 | 1.8 | 2.7 | 3 |
| 20 | 2.7 | 4.3 | 5.4 |
| 25 | 3.2 | 5.7 | 7.9 |
| 30 | 3.5 | 6.6 | 9.4 |
| 35 | 3.6 | 7.0 | 10.1 |
| 40 | 3.7 | 7.1 | 10.4 |

Table 1 shows how even though the peak throughput of HSDPA is 10.4 Mbps, the actual throughput of a particular UE device may be limited based on the number of codes it is capable of receiving. Therefore specific capabilities of the wireless communication device 108 (see FIG. 1) also need to be taken into account when looking at the mapping between CINR and throughput.

Figure 5:
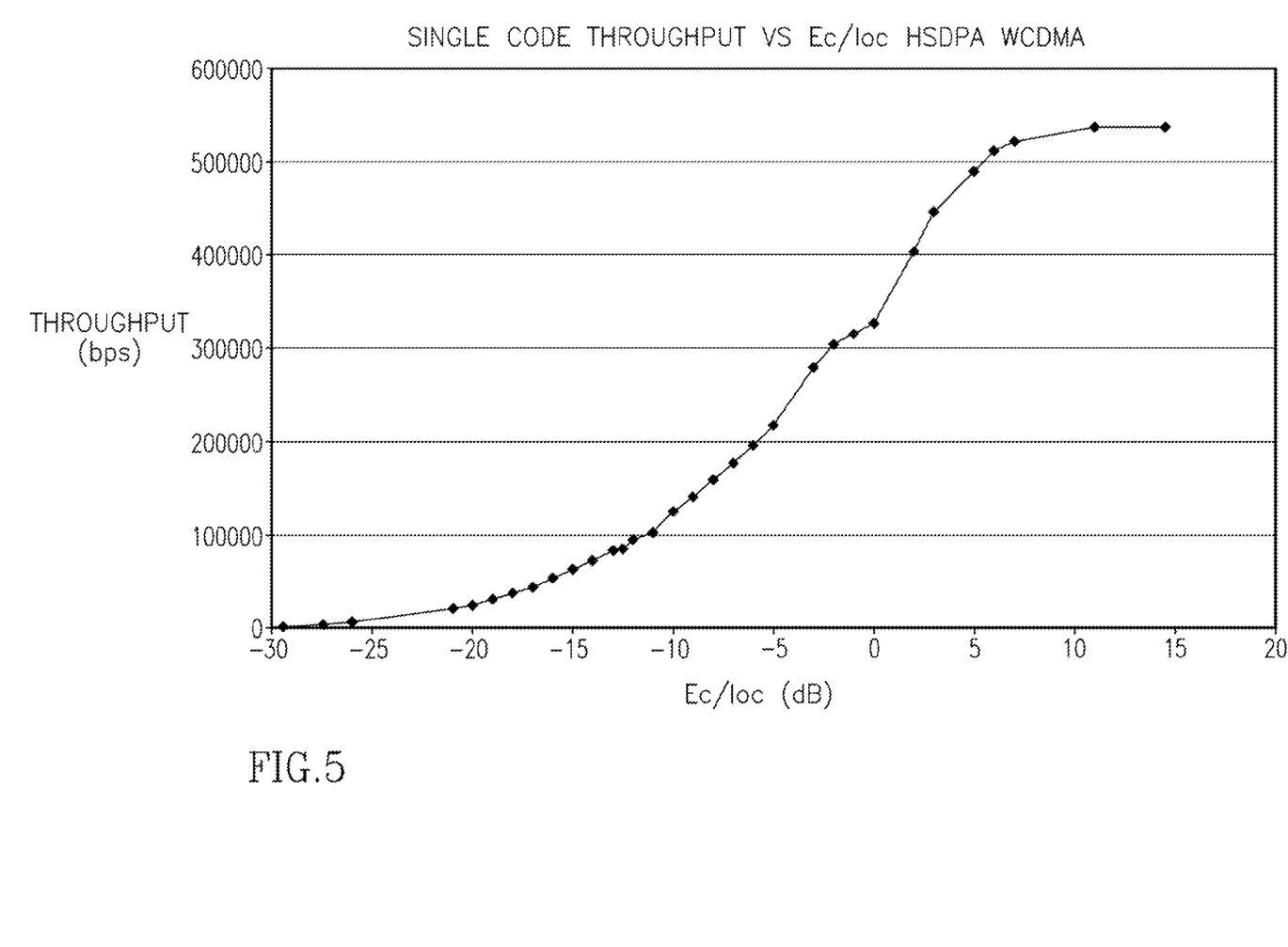
FIG. 5 is a graph illustrating data throughput for a single code as a function of carrier energy to noise plus interference.

FIG. 5 (from (3rd Generation Partnership Project, 2001-03)) shows a similar mapping as in FIG. 4, but this time the plot is of Ec/Io vs. throughput. The difference between the Ec/Io from FIG. 5 and SINR from FIG. 4 is that Ec/Io refers to the carrier to noise plus interference ratio for a single HSDPA code while the SINR refers to the carrier to noise plus interference ratio for multiple codes.

Figure 6:
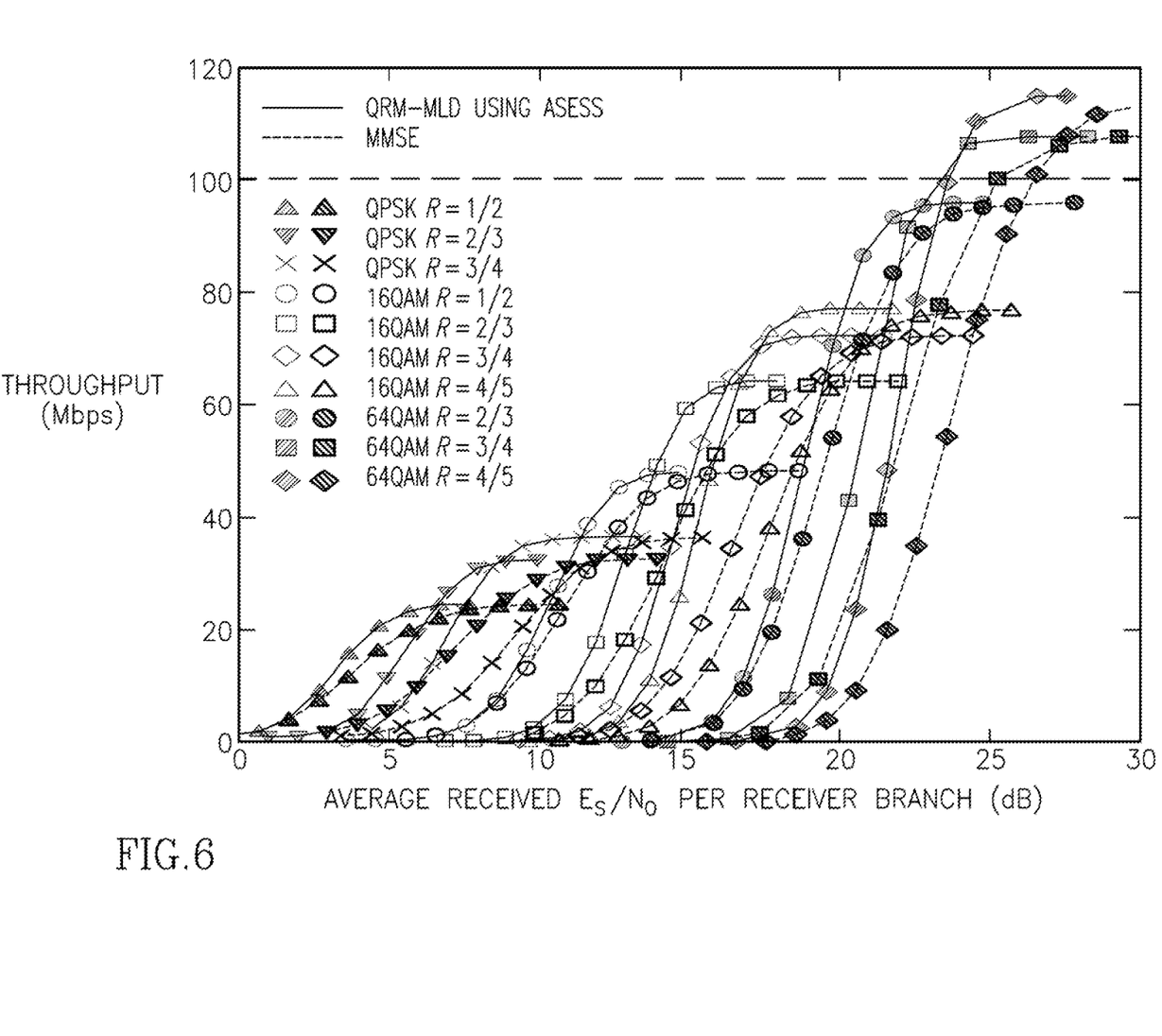
FIG. 6 is a graph illustrating LTE data throughput as a function of CINR for various modulation schemes and rates.

FIG. 6 (from (3rd Generation Partnership Project, 2006)) shows the Downlink LTE throughput vs. Es/No (SNR) for the 2×2 MIMO case of LTE in a 20 MHz channel. Es/No refers to the received symbol power divided by the normalized noise power. In a deployed system the noise power would be the sum of the thermal noise power plus interference power.

The peak throughput derived from the plot in FIG. 6 is taken as the peak throughput achieved for all modulation and coding schemes for a given Es/No. For example, the peak throughput for Es/No=20 dB is ~87 Mbps using the 64 QAM, rate 2/3 coding.

Figure 7:
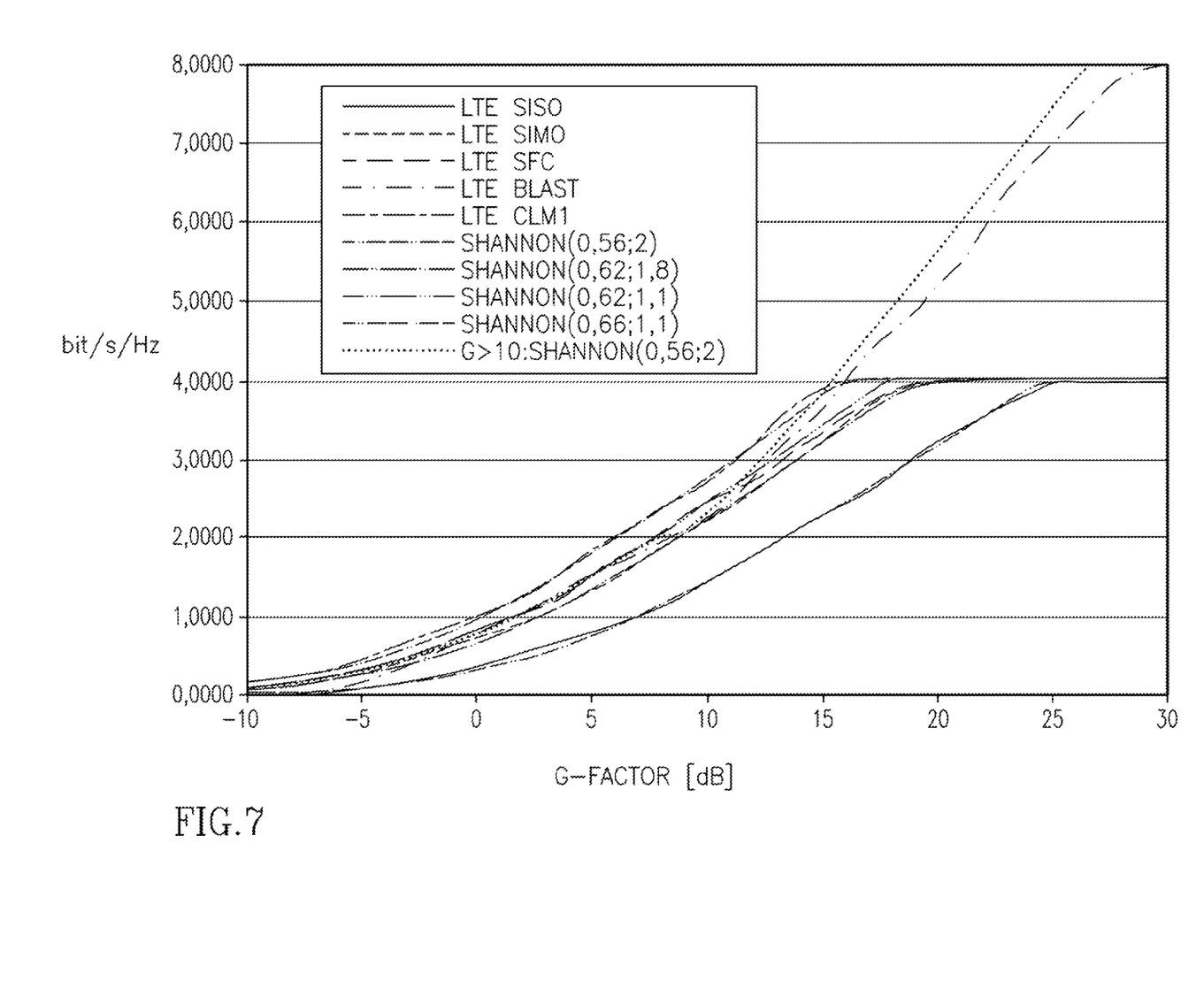
FIG. 7 is a graph illustrating spectral efficiency for various LTE implementations.

FIG. 7 (from (Mogensen, et al., 2007)) shows a plot of the Geometry Factor (G-Factor) vs. spectral efficiency for various flavors of LTE. In 3GPP nomenclature, the G-Factor is the total power from the serving base station divided by the sum of the noise plus interference power—i.e., the CINR.

FIG. 7 shows how the mapping from CINR to throughput can vary depending on the number of transmitters, number of receivers and the types of algorithms used in the system.

It should also be noted that the vertical axis in FIG. 7 is in units of bits per second per Hertz. LTE is different from previous 3 GPP wireless communication protocols in that it supports variable channel bandwidths. In order to convert from bits per second per hertz to a peak throughput, it is necessary to multiply by the actual channel bandwidth. It will also likely be necessary to take control channel signaling overhead into account in the conversion.

Table 2 below (from (Hwang, Refaei, Choi, Kim, Sohn, & Choi)) shows a mapping from Ec/Nt for the 1× EV-DO Rev. 0 wireless communication protocol. In this case, Nt is the thermal noise power of the system and Ec is the received power of a single code. Ec/Io can be used in place of Ec/Nt. The Rev. A wireless communication protocol is capable of a slightly higher peak throughput at a higher Ec/Io.

TABLE 2

1× Ev-DO Ec/Nt vs. Throughput

| Raw kbps | Ec/Nt (dB) |
|---|---|
| Null Rate | n/a |
| 38.4 | −11.5 |
| 76.8 | −9.7 |
| 153.6 | −6.8 |
| 307.2 | −3.9 |
| 307.2 | −3.8 |
| 614.4 | −0.8 |
| 614.4 | −0.6 |
| 921.6 | 1.8 |
| 1228.8 | 3.7 |
| 1228.8 | 3.8 |
| 1843.2 | 7.5 |
| 2457.6 | 9.7 |
| 1536.0 | Rev. A |
| 3072.0 | Rev. A |

Channel Quality Indicator

When a base station has data to transmit to a mobile station, it needs to know what is the appropriate modulation and coding scheme (MCS) to apply to the data so that it successfully arrives at the mobile station and utilizes the communication channel as efficiently as possible. This process is known as adaptive MCS selection.

There are many approaches that have been taken to implement adaptive MCS. Generally, some form of feedback is required from the mobile device to the base station for it to make intelligent decisions about the modulation and coding scheme to employ. The types of data that are usually fed back to the base station are:

CINR

Block error indications

Channel Quality Indicator

The last of these pieces of feedback—the channel quality indicator (CQI)—can be thought of as an instruction from the mobile station to the base station of the optimal MCS to be used by the base station when transmitting to the mobile station. The CQI generally maps directly to a particular modulation and coding scheme. The mobile station decides on the appropriate MCS/CQI based on the channel conditions that it observes and the device capabilities. This decision can be based upon the instantaneous CINR, and can incorporate other information such as the block error rate for a given MCS or ratio of block ACK/NACK.

If the CQI decisions could be made available (for example to applications running on mobile units), this could provide a very accurate indication of the peak throughput at which the mobile station is capable of receiving at any given time. Since CQI messages are generally fed back to a serving base station at a rate of several hundred CQI messages per second, some filtering of the CQI estimates would be required in order to arrive at an average rate over a period of seconds.

The CQI value can be mapped directly to an instantaneous peak channel throughput. For variable bandwidth protocols such as LTE or WiMAX, it is necessary to know the operating channel bandwidth for this conversion to convert from the CQI (which represents a Modulation and Coding Scheme, independent of bandwidth) to a throughput.

Algorithms to Determine a Peak Throughput from RF Metrics

Here we discuss several approaches that can be taken to making a peak throughput estimate using the RF metrics discussed above. Although the CINR RF metric is used, for example, it is understood that the same approach could be used with other types of RF metrics including RSSI and CQI or other similar RF metrics that quantify the channel radio quality and are related in a deterministic way to the peak channel throughput. These metrics may be referred to generically as a quality value for the radio link.

Direct Mapping of CINR to Instantaneous Peak Throughput

As shown above, there is a strong correlation between the instantaneous peak throughput and the CINR. If we know the relationship between CINR and throughput for a particular wireless communication technology then a simple lookup table can be used to look up the device throughput based on the CINR.

There are, of course, some implementation details that also have to be taken into account. These details are explored in the following sub-sections.

Averaging the CINR

Figure 8:
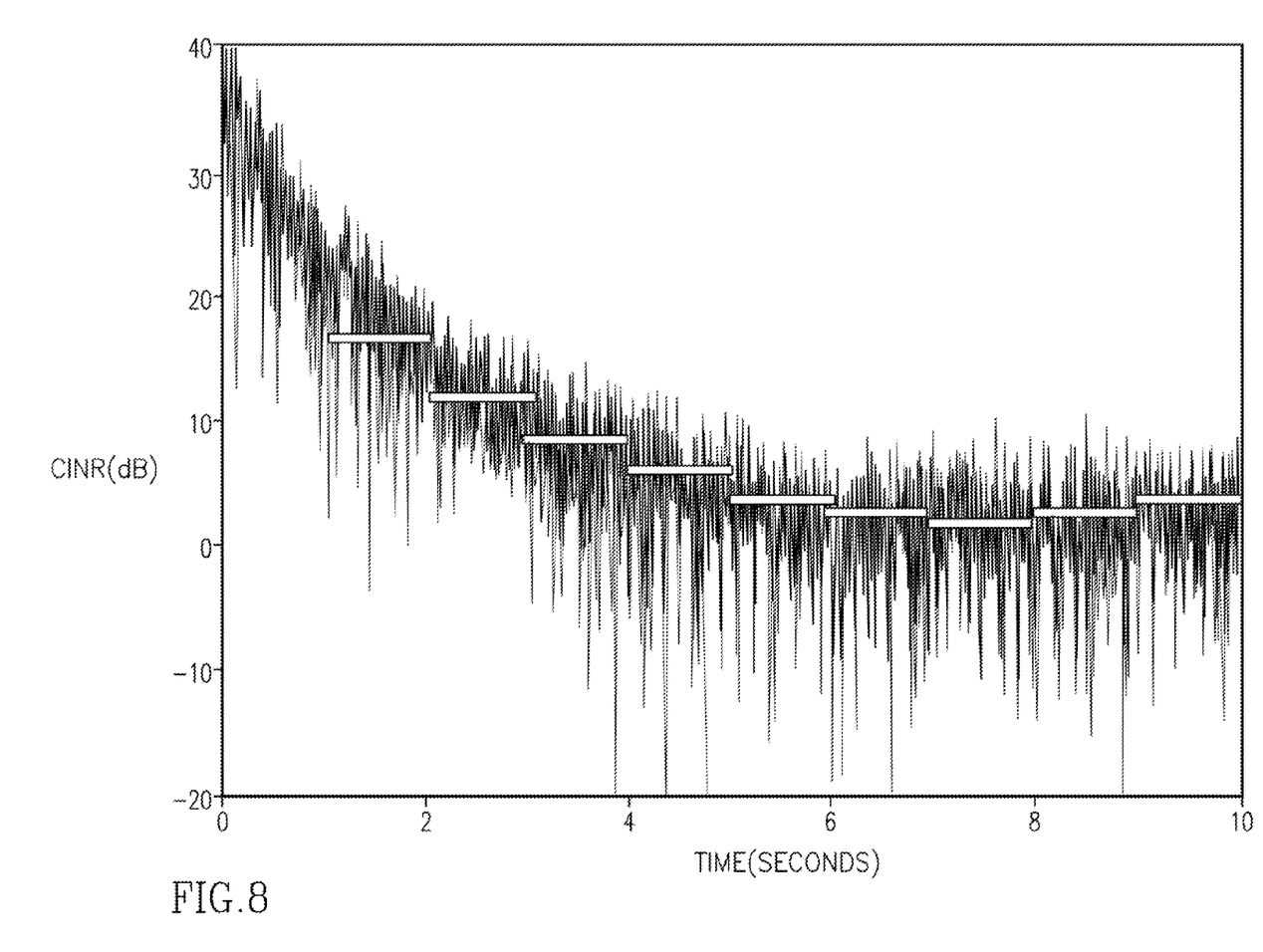
FIG. 8 is a graph illustrating instantaneous values of CINR as a function of time, as well as average CINR data for one second averages.

FIG. 8 shows a plot of instantaneous CINR vs. time for a mobile station moving away from one base station (e.g., the base station 120 of FIG. 2) towards an area with higher levels of interference from another base station (e.g., the base station 122). As can be seen from the plot, the instantaneous CINR can vary quite rapidly.

It makes sense to use a peak throughput estimate that is the average of the peak throughput over the timeframe of interest, i.e. in some scenarios over one or a few seconds. In FIG. 8 we show one second averages of the noisy CINR data.

Typically, CINR values reported from different mobile units include some averaging of the CINR in order to reduce the effects of the noise of instantaneous CINR estimates. Of course the amount of averaging taking place may not be readily apparent or known by other than the device manufacture.

Accordingly, to ensure that an appropriate amount of averaging is being performed when estimating the CINR for the purposes of estimating a throughput, in an embodiment several CINR readings per second are taken. A running average CINR value, for example using a simple single pole IIR (exponential) filter $$CINRavg = \alpha(CINRnew) + (1-\alpha)(CINRavg)$$

where d is a dimensionless filtering factor ranging between 0 (infinite time averaging) where the average always remains at its initial value and 1 (no averaging).

Generally, when performing this type of averaging, the linear representation of the CINR should be used, not the dB representation. The conversion from CINR in dB to linear is:

$$CINRlinear = 10\frac{CINRdB}{10}$$

The reverse operation is:

$$CINRdB = 10 * \log_{10} CINRlinear$$

Mobile Device Speed

Figure 3:
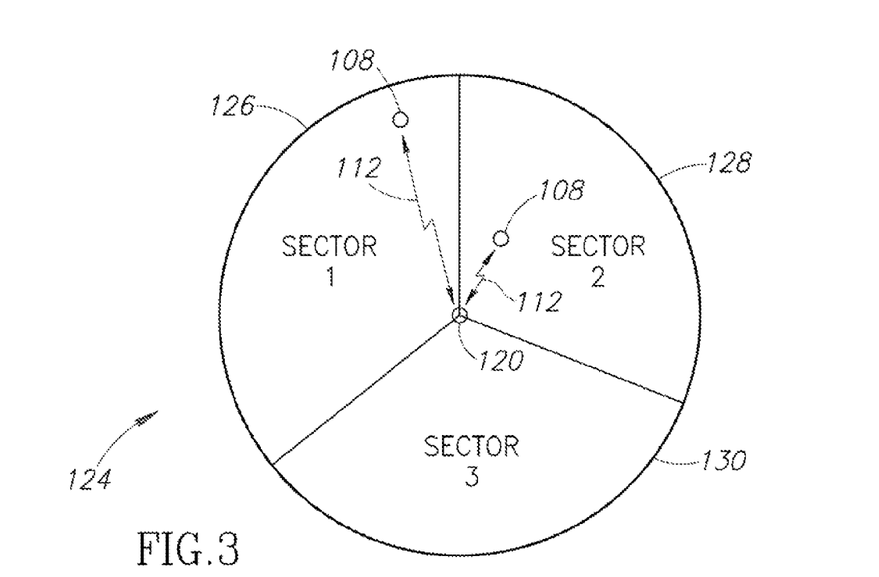
FIG. 3 illustrates an area of coverage for a base station.

The mapping between CINR and instantaneous peak throughput also varies with device speed (e.g., in km/hr) as the mobile device moves throughout the area of coverage 124 (see FIG. 3).

If the device speed is unknown then a mapping for a nominal device speed can be used.

If the device speed is known then a throughput estimate can be made from tables of CINR vs. throughput for two or three device speeds and interpolating the throughputs from the device speeds closest to the measured device speed.

The variation in the mapping based on device speed is generally less than a few percent, so normally a single table using a nominal CINR to throughput mapping is expected to be sufficient.

Device Capabilities

While a CINR value can be mapped to a peak instantaneous throughput, the achievable peak instantaneous throughput that a particular device can achieve may be limited by the device capabilities. In HSPA for example, Table 3 illustrates the following device categories established for HSPA release 6 (from reference (Craigen, 2007)):

TABLE 3

HSPA device capabilities

| HSPA Modem Category | Maximum DL Data Rate |
|---|---|
| 1, 2 | 1.2 Mbps |
| 3, 4 | 1.8 Mbps |
| 5, 6 | 3.6 Mbps |
| 7, 8 | 7.2 Mbps |
| 9 | 10.2 Mbps |
| 10 | 14.4 Mbps |
| 11 | 0.9 Mbps |
| 12 | 1.8 Mbps |

At the very least, the instantaneous peak estimation algorithm should make sure that the device capabilities are taken into account so that the peak throughput estimate is capped by the device capabilities.

However, the peak throughput limit for a particular device can manifest itself in different ways. For example a HSDPA device that is capable of receiving only five CDMA codes on the HS-DSCH has a different mapping between CINR and peak throughput when compared to a device capable of receiving all 15 codes (e.g., see FIG. 4).

Additionally, the configuration for voice support can also consume codes that could otherwise be used for data, similarly reducing the available peak data bandwidth on the channel regardless of device capability.

Automatic Peak Throughput vs. CINR Learning Algorithm

In the previous sections, we have assumed that the mapping between CINR and the throughput is known for a given technology. Often times however, the mapping between a CINR value and a peak throughput may not be readily available for several reasons:

The mapping may depend on device capabilities. For example, a device may be limited in the number of CDMA codes it can receive simultaneously. In HSDPA, the peak throughput will change depending on whether or not a mobile device supports MIMO.

When a mapping is available, it generally refers to the peak physical layer data throughput achievable for a given CINR. However, this peak value includes both user data and any associated control messaging overhead. The peak throughput achievable by a user application will always be lower than the physical layer peak throughout, sometimes by as much as 30%.

A technology is updated, or a new technology is made available that changes the mapping.

Here we describe how a historical peak-hold throughput estimation mechanism can be modified to automatically learn, over time, the mapping between the CINR measurement at the device and the peak throughout that the device can achieve for each CINR.

In the baseline peak throughput estimation algorithm, a single peak throughput is maintained. In the modified algorithm, a peak throughput is maintained for each CINR value that is seen in the system.

The peak throughput for each CINR can be initialized to zero. When a new peak throughput is determined for a given CINR, the peak throughput of higher CINR values are checked to see if they are less than the peak throughput determined for the lower CINR. If so, then they can be set equal to the peak throughput determined for the lower CINR value. For example, in Table 4 below, a peak value of 1.0 Mbps is measured at a CINR value of 6 dB. In the absence of peak throughput measurements at higher CINR levels, it can be assumed that the peak throughput for higher CINR levels is at least as good as the peak throughput value for the actual measurement at 6 dB. Thus, the table is updated for higher CINR values based on the single measurement at 6 dB. As actual measurements at higher CINR values become available, the table is updated further, as described below.

TABLE 4

CINR vs. peak throughput learning algorithm in action

| CINR | Step | | | | | | | |
|---|---|---|---|---|---|---|---|---|
| | 0 | 1 | 2 | 3 | 4 | 5 | 6 | 7 |
| -10 | 0 | 0 | 0 | 0 | 0 | 0 | 0 | 0 |
| -8 | 0 | 0 | 0 | 0.2 | 0.2 | 0.2 | 0.2 | 0.2 |
| -6 | 0 | 0 | 0 | *0.2* | 0.2 | 0.2 | 0.2 | 0.2 |
| -4 | 0 | 0 | 0 | *0.2* | 0.2 | 0.2 | 0.2 | 0.2 |
| -2 | 0 | 0 | 0 | *0.2* | 0.2 | 0.2 | 0.2 | 0.2 |
| 0 | 0 | 0.5 | 0.5 | 0.5 | 0.5 | 0.5 | 0.5 | 0.5 |
| 2 | 0 | *0.5* | 0.5 | 0.5 | 0.5 | 0.5 | 0.5 | 0.5 |
| 4 | 0 | *0.5* | 0.5 | 0.5 | 0.5 | 0.5 | 0.5 | 0.5 |
| 6 | 0 | *0.5* | 1 | 1 | 1 | 1 | 1 | 1 |
| 8 | 0 | *0.5* | *1* | 1 | 1 | 1 | 1 | 1 |
| 10 | 0 | *0.5* | *1* | 1 | 1 | 1 | 1 | 1 |
| 12 | 0 | *0.5* | *1* | 1 | 3 | 3 | 3 | 3 |
| 14 | 0 | *0.5* | *1* | 1 | *3* | 3 | 3 | 3 |
| 16 | 0 | *0.5* | *1* | 1 | *3* | 3 | 3.5 | 3.5 |
| 18 | 0 | *0.5* | *1* | 1 | *3* | 4 | 4 | 4 |
| 20 | 0 | *0.5* | *1* | 1 | *3* | *4* | 4 | 5 |

As more and more peak throughput estimates are established the mapping of CINR to peak throughput is updated.

As an example, Table 4 shows the evolution of a CINR to peak throughput mapping table over time. The CINR values are shown in the first column. Each of the next columns shows the peak throughput table (Mbps units) as it is updated with each new peak throughput estimate corresponding to a particular CINR. The new peak estimate is shown in bold with a highlighted background and the higher CINR peak throughput estimates that are updated based on this estimate are shown in italics with a highlighted background.

At step 1, we assume that the peak throughput estimation algorithm has made its first peak throughput estimate of 0.5 Mbps at CINR of 0 dB. Since each of the peak estimates for the CINRs greater than 0 dB were previously set to zero, they are updated and set to 0.5 Mbps, since the throughput for higher CINRs should be at least as good as the throughput at lower CINRs.

At step 2, the peak estimation algorithm makes a second peak throughput estimate of 1 Mbps at a CINR of 6 dB. The 6 dB CINR entry and all higher CINR entries are updated to 1 Mbps.

At step 3, the peak estimation algorithm makes a peak throughput estimate of 0.2 Mbps at a CINR of −8 dB. The peak throughputs for CINRs from −8 dB to −2 dB are set to 0.2 Mbps, as they were all previously less than 0.2 Mbps.

At step 4, the peak estimation algorithm makes a peak throughput estimate of 3 Mbps at a CINR of 12 dB. The peak throughputs for CINRs from 12 dB to 20 dB are set to 3 Mbps, as they were all previously less than 3 Mbps.

At step 5, the peak estimation algorithm makes a peak throughput estimate of 4 Mbps at a CINR of 18 dB. The peak throughputs for CINRs from 18 dB to 20 dB are set to 4 Mbps, as they were all previously less than 3 Mbps.

At step 6, the peak estimation algorithm makes a peak throughput estimate of 3.5 Mbps at a CINR of 16 dB. Since the peak throughputs of higher CINRs are all greater than 3.5 Mbps, only the peak throughput for a CINR of 16 dB is updated.

At step 7, the peak estimation algorithm makes a peak throughput estimate of 5 Mbps at a CINR of 20 dB. Since this is the highest CINR, this is the only one that is updated.

Figure 9:
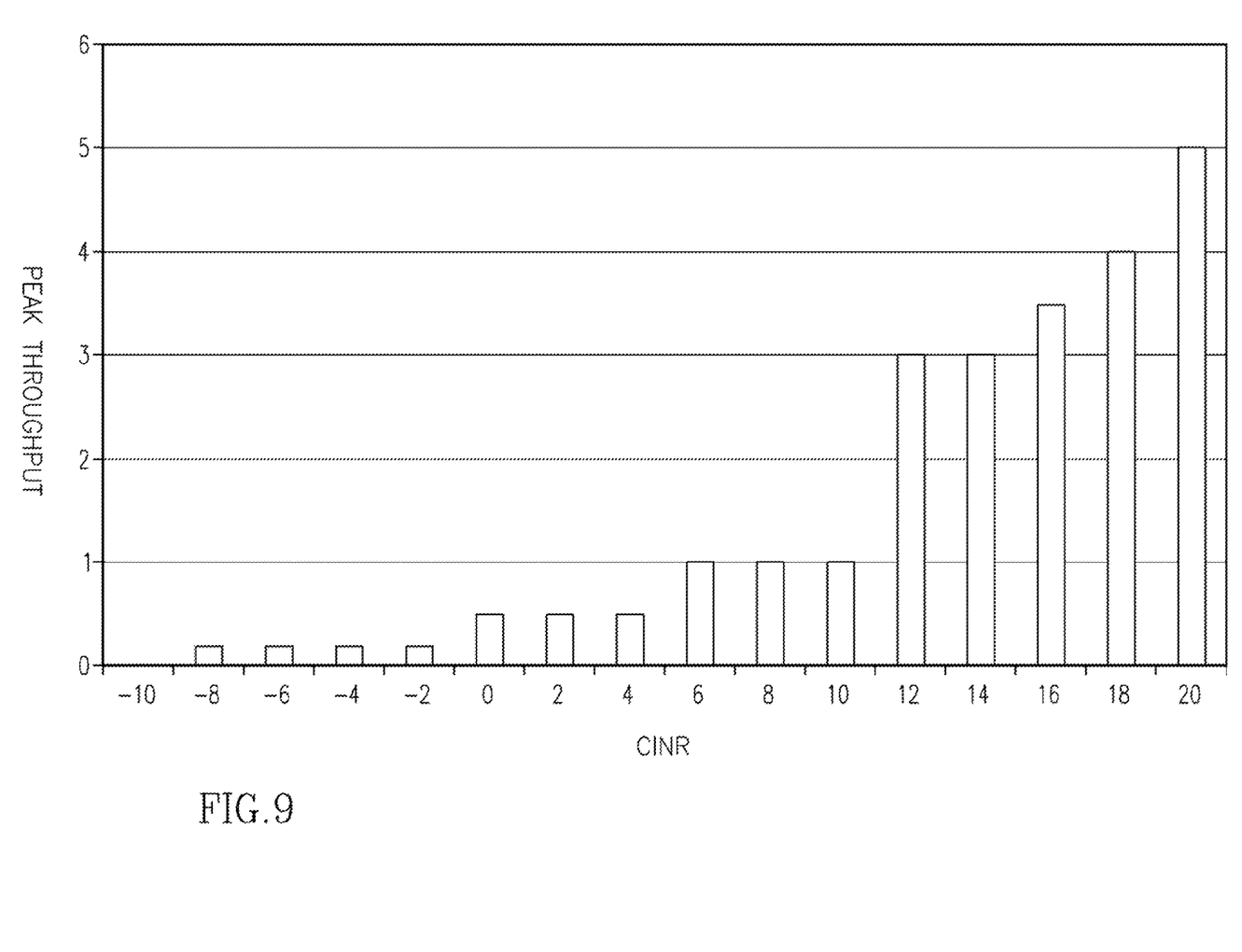
FIG. 9 is a bar graph illustrating peak throughput values as a function of CINR.

A graph of the peak throughput estimate for each CINR after step 7 is shown in FIG. 9. Those skilled in the art will appreciate that the mapping process may operate continually within the wireless communication device 108 (see FIG. 1). Updates in the system 100, such as improvements to transmitters in the base station 120 (see FIG. 2), for example, may result in a higher data throughput than previously mapped. If the process illustrated in Table 4 operates on a continuous or periodic basis, those changes in the system 100 will be detected and the data in Table 4 can be automatically updated.

Linear Interpolation

Instead of simply replicating a peak throughput estimate for a given CINR to all higher CINRs that have lower peak throughput estimates, a linear interpolation between the new peak throughput and a higher CINR with a previous peak throughput could be made. The interpolation can also extend to lower CINRs where a previous peak throughput had been made.

Using the same example as above, the evolution of the peak throughput table is shown in Table 5.

TABLE 5

Throughput estimation table with linear interpolation

| CINR | Step 0 | 1 | 2 | 3 | 4 | 5 | 6 | 7 |
|---|---|---|---|---|---|---|---|---|
| −10 | 0 | 0 | 0 | 0 | 0 | 0 | 0 | 0 |
| −8 | 0 | 0 | 0 | 0.2 | 0.2 | 0.2 | 0.2 | 0.2 |
| −6 | 0 | 0 | 0 | 0.275 | 0.275 | 0.275 | 0.275 | 0.275 |
| −4 | 0 | 0 | 0 | 0.350 | 0.35 | 0.35 | 0.35 | 0.35 |
| −2 | 0 | 0 | 0 | 0.425 | 0.425 | 0.425 | 0.425 | 0.425 |
| 0 | 0 | 0.5 | 0.5 | 0.5 | 0.5 | 0.5 | 0.5 | 0.5 |
| 2 | 0 | 0.5 | 0.67 | 0.67 | 0.67 | 0.67 | 0.67 | 0.67 |
| 4 | 0 | 0.5 | 0.83 | 0.83 | 0.83 | 0.83 | 0.83 | 0.83 |
| 6 | 0 | 0.5 | 1 | 1 | 1 | 1 | 1 | 1 |
| 8 | 0 | 0.5 | 1 | 1 | 1.67 | 1.67 | 1.67 | 1.67 |
| 10 | 0 | 0.5 | 1 | 1 | 2.33 | 2.33 | 2.33 | 2.33 |
| 12 | 0 | 0.5 | 1 | 1 | 3 | 3 | 3 | 3 |
| 14 | 0 | 0.5 | 1 | 1 | 3 | 3.33 | 3.33 | 3.33 |
| 16 | 0 | 0.5 | 1 | 1 | 3 | 3.67 | 3.67 | 3.67 |
| 18 | 0 | 0.5 | 1 | 1 | 3 | 4 | 4 | 4 |
| 20 | 0 | 0.5 | 1 | 1 | 3 | 4 | 4 | 5 |

At step 1, since there are no previous throughput estimates made for any CINR, the peak throughput estimate of 0.5 Mbps for a CINR of 0 dB is filled in as before and extended to all higher CINRs. Note that the peak throughput estimates for lower CINRs are left as-is since there was no previous peak estimate made for lower CINRs.

At step 2 the peak throughout estimate of 1 Mbps made for a CINR of 6 dB is extended to all higher CINRs. The peak throughput for the lower CINRs of 2 dB and 4 dB are interpolated between the previously established peak throughput of 0.5 Mbps at 0 dB CINR and the new estimate of 1 Mbps at 6 dB CINR.

At step 3, the peak throughput estimates for CINRs of −6 dB, −4 dB and −2 dB are linearly interpolated from the new peak throughput estimate of 0.2 Mbps at a CINR of −8 dB and an older peak throughput estimate of 0.5 Mbps at 0 dB CINR.

At step 4 the peak throughput estimate of 3 Mbps at 12 dB CINR is replicated to all higher CINRs and linearly interpolated peak throughput estimates are made for CINRs of 8 dB and 10 dB.

At step 5 the peak throughput estimate of 4 Mbps at 18 dB CINR is replicated to all higher CINRs and linearly interpolated peak throughput estimates are made for CINRs of 14 dB and 16 dB.

In the previous example, a peak throughput estimate of 3.5 Mbps was made for a CINR of 16 dB. In this example, this would be superseded by the interpolated throughput estimate of 3.67 Mbps previously made for this CINR.

Note that we differentiated between peak throughput estimates from the measured peak throughput estimation and linearly interpolated peak throughput estimates. The interpolation should only be carried out between estimates made by the measured peak throughput estimation process. Here we assume some method of measuring the peak channel throughput such as sending a burst of data and measuring how long it takes to deliver the burst or by some other method such as based on the latency dynamics of the channel.

This modification to the previous algorithm could be tested empirically to ensure that the interpolated throughput estimates are indeed in line with the actual peaks that would be measured.

Higher order Interpolation

Figure 10:
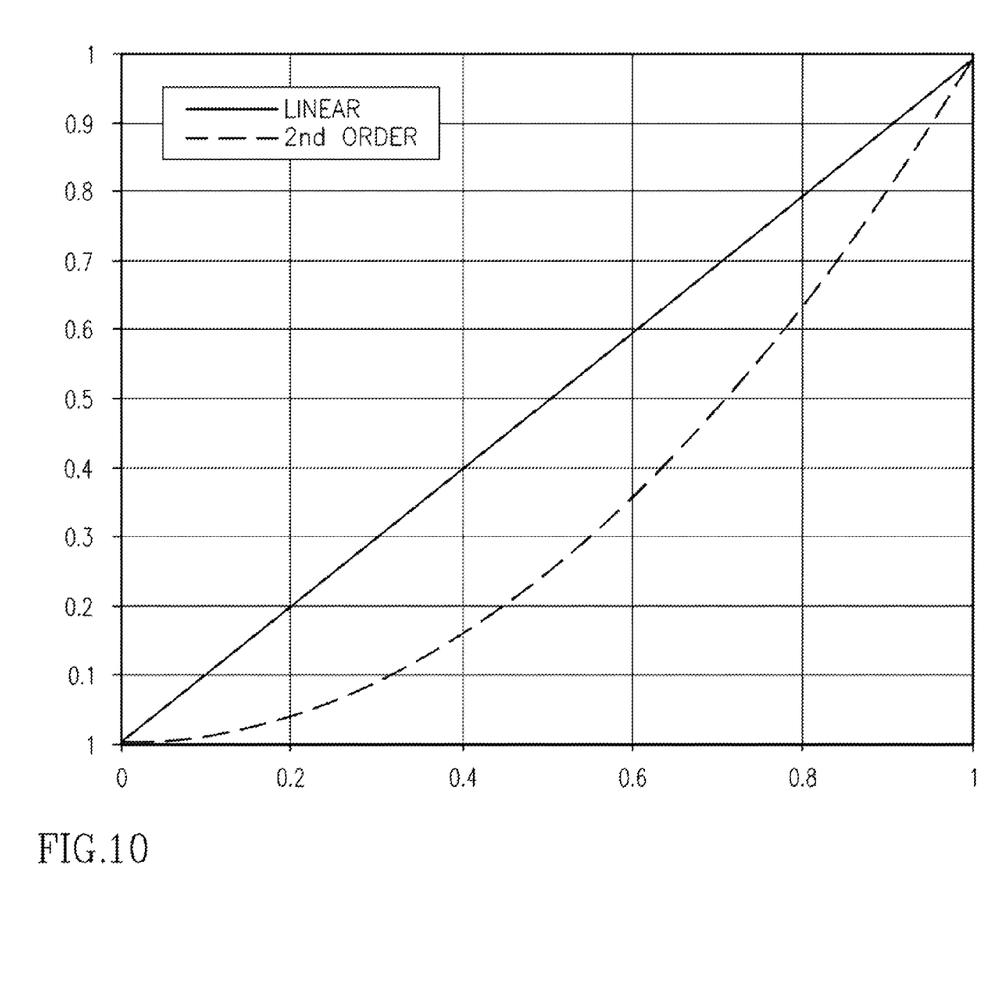
FIG. 10 is a graph illustrating alternate linear and second order interpolation values used for interpolating throughput data as a function of CINR.

As an alternate to linear interpolation, a higher order interpolating polynomial could be used. For example, FIG. 10 shows both a first order (linear) and second order interpolation between the points (0,0) and (1,1).

The general formula for estimating a throughput, t2 at a CINR, CINR2 when the throughputs t0 and t1 and CINR0 and CINR1 are known is shown in the equation below. For linear interpolation, n=1. For second order interpolation, n=2.

$$t2 = t0 + (t1 - t0)\left(\frac{CINR2 - CINR0}{CINR1 - CINR0}\right)^n$$

The updates to the peak throughput estimation table when using a second order interpolation are shown in Table 6.

TABLE 6

Throughput estimation table with $2^{nd}$ order interpolation

| CINR | Step 0 | 1 | 2 | 3 | 4 | 5 | 6 | 7 |
|---|---|---|---|---|---|---|---|---|
| −10 | 0 | 0 | 0 | 0 | 0 | 0 | 0 | 0 |
| −8 | 0 | 0 | 0 | 0.2 | 0.2 | 0.2 | 0.2 | 0.2 |
| −6 | 0 | 0 | 0 | 0.275 | 0.275 | 0.275 | 0.275 | 0.275 |
| −4 | 0 | 0 | 0 | 0.350 | 0.35 | 0.35 | 0.35 | 0.35 |
| −2 | 0 | 0 | 0 | 0.425 | 0.425 | 0.425 | 0.425 | 0.425 |
| 0 | 0 | 0.5 | 0.5 | 0.5 | 0.5 | 0.5 | 0.5 | 0.5 |
| 2 | 0 | 0.5 | 0.67 | 0.67 | 0.67 | 0.67 | 0.67 | 0.67 |
| 4 | 0 | 0.5 | 0.83 | 0.83 | 0.83 | 0.83 | 0.83 | 0.83 |
| 6 | 0 | 0.5 | 1 | 1 | 1 | 1 | 1 | 1 |
| 8 | 0 | 0.5 | 1 | 1 | 1.67 | 1.67 | 1.67 | 1.67 |
| 10 | 0 | 0.5 | 1 | 1 | 2.33 | 2.33 | 2.33 | 2.33 |
| 12 | 0 | 0.5 | 1 | 1 | 3 | 3 | 3 | 3 |
| 14 | 0 | 0.5 | 1 | 1 | 3 | 3.33 | 3.33 | 3.33 |
| 16 | 0 | 0.5 | 1 | 1 | 3 | 3.67 | 3.67 | 3.67 |
| 18 | 0 | 0.5 | 1 | 1 | 3 | 4 | 4 | 4 |
| 20 | 0 | 0.5 | 1 | 1 | 3 | 4 | 4 | 5 |

Figure 11:
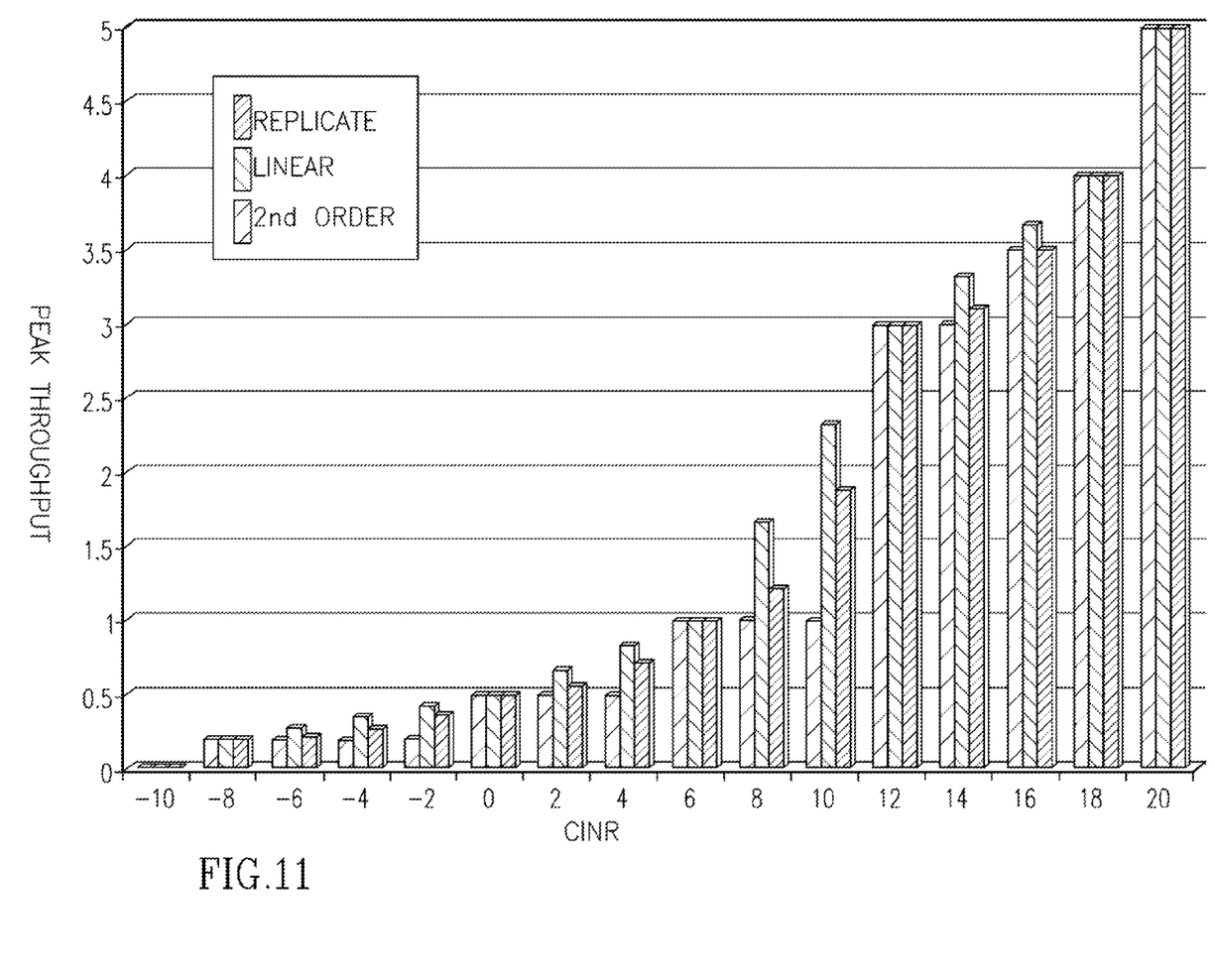
FIG. 11 is a bar graph similar to FIG. 9, but illustrating peak throughput values as a function of CINR using various interpolations.

A comparison of the throughput vs. CINR table after step 7 for each of the update schemes (replicate only, Linear interpolation and $2^{nd}$ order interpolation) is shown in FIG. 11.

Multiple Wireless Network Types

For some mobile devices there will often be scenarios where the device moves between network types. In these cases there could be several CINR tables maintained corresponding to each separate network type.

For example a terminal could be located on a 3G HSPA network and later travel to a location only served by 2.5G EDGE technology. Since the inherent capabilities of the two types of networks are different, separate CINR-to-peak-throughput tables are learned and maintained on each network type.

In order to determine which lookup table to use the mobile device would need a reporting method to indicate the currently serving network type. It is understood that this type of reporting is a standard feature of the application programming interfaces in most commercial handsets.

Mobile Wireless Technologies Summary

Table 7 shows a list of the most common packet switched wireless technologies and their peak data rate capabilities. These are the technologies supported by modern smartphones.

TABLE 7

Deployed Wireless Data Technologies

| Technology | Family | Data Rates |
|---|---|---|
| GPRS | 3GPP | 56 kbps typical |
| | | 114 kbps max |
| EDGE | 3GPP | 180 kbps typical |
| | | 236.8 kbps peak (4 timeslots) |
| | | 473.6 kbps peak (8 timelsots) |
| UMTS (W-CDMA) | 3GPP | 2 Mbps peak |
| HSDPA | 3GPP | 1.8-14.4 Mbps peak |
| | | 3.5 Mbps/sector typical |
| HSPA+ (Release 7) | 3GPP | 21-28 Mbps peak (2 × 2 MIMO) |
| | | 1.8-14.4 Mbps peak (2 × 1 SIMO) |
| | | 6.2 Mbps/sector typical |
| LTE | 3GPP | >100 Mbps |
| CDMA-2000 | 3GPP2 | 144 kbps peak |
| CDMA2000 1x RTT | 3GPP2 | 307.2 kbps peak |
| | | 125 kbps typical |
| EV-DO 1x Rev. 0 | 3GPP2 | 2.45 Mbps peak, 750 kbps typical |
| EV-DO 1x Rev. A | 3GPP2 | 3.1 Mbps |
| EV-DO Rev. B | 3GPP2 | 4.9 Mbps/carrier |

Thus, one can appreciate that peak throughput values can be measured in a variety of different manners and associated with a particular data throughput rate. The data throughput rate is dependent on the quality of the wireless communication link 112 (see FIG. 1). However, the quality of the wireless communication link 112 is dependent upon a number of factors discussed above. In addition, the actual type of the wireless communication device 108 may affect the data throughput. That is, some devices are simply faster than other devices and thus have a greater data throughput for a given quality value of the wireless communication link 112. For this reason, in one embodiment, the system 100 stores the table or tables discussed above in a storage location within the wireless communication device 108 itself. The data may be conveniently stored as a data look-up table. However, any form of suitable data storage structure may be used to satisfactorily implement the system 100. The system 100 is not limited by any particular form of data storage. In one embodiment, the wireless communication device 108 may store data tables for multiple base stations, such as the base stations 120-122 in FIG. 2. This may be especially useful in situations where the overall communication has base stations that are not identical, and thus have different data throughput values. For example, the communication link 138 coupling the base station 120 to the BSC 136 may comprise multiple T1 backhaul lines. In contrast, the communication link 140 coupling the base station 122 to the BSC 136 may have only a single T1 backhaul line. Those skilled in the art can appreciate that the base station 120 may have significantly greater data throughput rates because of decreased backhaul congestion on the communication link 138. In this circumstance, the wireless communication device 108 may have data tables for both the base stations 120 and 122 so as to distinguish between poor radio quality links and network congestion separately for each base station.

Those skilled in the art will appreciate that only a single data table may be applicable for all base stations if the telecommunication network uses identical base stations and identical backhaul communication links.

In yet another variation, the wireless communication device 108 may store different data tables for different sectors of a cell site. For example, the sector 130 in FIG. 3 may have a lower data transmission throughput rate than, by way of example, the sector 126. Thus, the wireless communication device 108 can retrieve the appropriate data based on the particular sector with which the wireless communication device is communicating. If all sectors have identical capabilities throughout the wireless communication system, the wireless communication device 108 need only store a single table that is applicable to all sectors.

In yet another alternative embodiment, the data table discussed above may be stored remotely from the wireless communication device 108 and downloaded at the start of a communication session to download a data file. For example, the data tables discussed above can be downloaded to the wireless communication device 108 via the RAN 110 illustrated in FIG. 1. For example, at the start of a data transfer session, the data file is stored in the data source 104. Just prior to the initiation of the data file download, the appropriate data tables for the currently serving base station (and sectors), as well as data tables for nearby base stations (and sectors) may be downloaded to the wireless communication device 108. In this manner, a wireless communication device 108 receives the current data for the nearby base stations. As noted above, data transfer rates may be dependent. Thus, the system 100 can provide the appropriate data tables to the wireless communication device 108 based on the identification of the type of wireless communication device to which the data file will be transferred.

As discussed above, the wireless communication device 108 uses the data table to determine the expected peak data throughput based on the current measured value of the CINR. For example, using the data from Table 4 (Step 7), the wireless communication device measures the current CINR value if, by way of example, the CINR value is 8 dB, the expected peak throughput rate is 1.0 Mbps. If the actual data throughput rate is lower than this value, the wireless communication device can send a message to the data source 204 via the RAN 110 indicating that it has detected congestion. In response to network congestion, the system 100 can cause the data source 104 to slow down or even temporarily suspend data transfer so as to avoid the undesirable side effects of network congestion. This advantageously allows the system 100 to differentiate between low transfer rates caused by poor quality of the wireless communication link 112 (see FIG. 1) versus low transfer rates caused by network congestion. If the low transfer rate is caused by poor quality of the wireless communication link 112, the wireless communication device 108 can also send a message to the data source 104 via the RAN 110 indicating that the low transfer rate is caused by poor coverage rather than network congestion.

Those skilled in the art will appreciate that the actual data throughput rate may momentarily drop below the expected data throughput rate. To avoid unnecessary reporting, the system 100 may further add a time duration threshold prior to sending a congestion detection message to the data source 104. For example, the system may impose a time duration requirement that requires that the actual data throughput rate is below the expected peak throughput rate for a pre-determined period of time. In one example, the system 100 could require that the actual data throughput rate is less than the expected peak throughput rate for at least one second before it sends a congestion detection message to the data source 104. In yet another variation, the system may require that the actual data throughput rate be less than the expected peak throughput rate by a threshold amount. For example, if the expected throughput rate is 1.0 Mbps and the actual data throughput rate is 995 Kbps, one may consider that the wireless communication link 112 is operating essentially at its peak channel capacity. Again, to avoid unnecessary reporting of congestion, the system may require that the actual data throughput rate be less than the expected peak throughput rate by a pre-determined threshold amount. The threshold amount may be stated in absolute terms (e.g., the actual data throughput rate is less than the expected peak throughput rate by 25 Kbps) or as a percentage of the expected peak throughput rate (e.g., the actual data throughput rate is less than 90% of the expected peak throughput rate). In yet another embodiment, the system 100 could use a combination of the time duration threshold and a drop in the actual throughput rate below a threshold value.

In the process described above, the wireless communication device autonomously discovers the peak channel capacity for various levels of signal quality (e.g., CINR) and automatically completes the table, such as Table 4, in an iterative process. Those skilled in the art will appreciate that this iterative process can be a continuous and on-going process. While Table 4 illustrates only 7 steps from the starting point where the data table is empty, the process can continue until each of the CINR values has an actual measurement. Furthermore, as time goes on, aspects of the system 100 may change thus making the data obsolete. For example, changes to the RAN 110 may result in an improvement of the base station 122. Because the base station 122 may now have a greater throughput rate, the data tables may be altered to reflect the fact that a greater throughput may be available for a given CINR value.

In yet another embodiment, the data tables for a particular wireless communication device may be prepopulated, thus eliminating the need for a multi-step process illustrated in the data tables above. For example, rather than start with the data tables having a value of zero for all quality levels of the wireless communication link 112, the system 100 may preload the data table and download it to the wireless communication device 108 via the RAN 110. For example, the data of Table 4, Step 7 can be downloaded to the wireless communication device 108 for the particular base station and/or sector with which the wireless communication device is currently communicating. Thus, the wireless communication device begins with a prepopulated data table that reasonably reflects the expected data throughput rates for a given quality value of the wireless communication link 112 (see FIG. 1). The wireless communication device 108 can update the prepopulated data table as discussed above to reflect current system conditions. As noted above, the expected peak data throughput rates may vary based on the type of the wireless communication device 108. Thus, the system 100 must prepopulate the data table with data appropriately selected for the type of wireless communication device 108.

The examples presented above relate to network congestion on the downlink. That is, network congestion while transferring a data file from the data source 104 (see FIG. 1) coupled to the network 106 and downloaded via the downlink to the wireless communication device 108. However, the principles described herein are equally applicable to the uplink. That is, the wireless communication device 108 may wish to upload a file, such as a video or multi-media file, to the network 102 via the RAN 110. The general methodology described herein is applicable to both the downlink and the uplink. The added challenge with the uplink is that measurement of the quality of the wireless communication link 112 is more direct because the wireless communication device 108 cannot directly determine the quality of the radio signal received by the base station (e.g., the base station 120 in FIG. 2). However, there are indirect methods that can be used to determine the quality of the wireless communication link 112. For example, the transmit power and/or the MCS that the base station 120 commands the wireless communication device 108 to use are indicators of the quality of the wireless communication link 112. A higher transmit power on the uplink or a more robust MCS tends to indicate a lower quality for the wireless communication link 112. Thus, the wireless communication link 112 would have a lower data throughput capacity. Additionally, the base station 120 can be configured to transmit a signal quality indicator back to the wireless communication device 108 for its determination of and distinction between congestion issues versus radio coverage quality. Furthermore, from a practical standpoint, the wireless communication device 108 can be configured to assume that the uplink and downlink channels are roughly symmetrical in quality and simple use the downlink quality values for the wireless communication link 112 as the indication of uplink quality. The wireless communication device 108 can construct an uplink table indicating quality of the wireless communication link 112 uplink versus expected data throughput in a manner similar to that discussed above with respect to the examples of the downlink quality. Those skilled in the art will appreciate that in the uplink case, the terms "server" and "client" end points are essentially reversed. In this example, it is the wireless communication device 108 that would have to throttle back its data rate in the presence of congestion while in the downlink example, it is the data source 104 (see FIG. 1) that throttles its data delivery rate to avoid congestion.

Thus, the system 100 provides a useful technique for distinguishing between low data transfer rates caused by poor quality of the wireless communication link 112 (see FIG. 1) versus network congestion. The network need only slow down the data transfer rate if network congestion exists. The system allows each wireless communication device to autonomously detect the peak channel capacity and to iteratively populate a data table that may be unique to the wireless communication device, the base station, base station sector, or the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

REFERENCES

3rd Generation Partnership Project. (2006). TS 25.814 *Physical layer aspects for Evolved Universal Terrestrial Radio Access*.

3rd Generation Partnership Project. (2001-03). TS 25.848 *Physical Layer Aspects of UTRA High Speed Downlink Packet Access*.

Craigen, A. (2007). *The role and impact of user equipment in HSxPA networks*. Icera Inc.

Holma, H., & Toskala, A. (2006). *HSDA/HSUPA for UMTS: High Speed Radio Acces for Mobile Communications*. John Wiley & Sons, Ltd.

Holma, H., & Toskala, A. (2009). *LTE for UMTS-OFDMA and SC-FDMA Based Radio Access*. John Wiley & Sons.

Hwang, J., Refaei, M. T., Choi, H.-A., Kim, J.-H., Sohn, J., & Choi, H. I. *Policy-Based QoS-Aware Packet Scheduling for CDMA 1x Ev-DO*.

Mogensen, P., Na, W., Kovacs, I. Z., Frederiksen, F., Pokhariyal, A., Pedersen, K. I., et al. (2007). LTE Capacity compared to the Shannon Bound. Dublin: IEEE Vehicular Technology Conference, 2007.

The invention claimed is:

1. A method for use in a communication network comprising:
   determining a first quality value representing a first signal quality in a first radio link between a base station and a mobile terminal based on a first signal transmitted to the mobile terminal by the base station;
   determining a first data throughput value for the first radio link;
   storing the first data throughput value in association with the first quality value; and
   in a subsequent communication at a later time:
   receiving a second signal transmitted by the base station at the mobile terminal, the second signal being based on a data file transmitted to the mobile terminal by a data source via the base station, the data source being remotely located from the base station and transmitting the data file at a transfer rate;
   determining a second quality value representing a second signal quality in a second radio link between the base station and the mobile terminal based on second signal transmitted to the mobile terminal by the base station;
   determining an expected data throughput value by retrieving the stored first data throughput value associated with the first quality value;
   determining a second data throughput value associated with the second signal received by the mobile terminal;
   determining that there is congestion at a node between the data source and the base station when the second data throughput value is less than the expected data throughput value; and
   sending a command to the data source to slow down the transfer rate of the data file when the second data throughput value is less than the expected data throughput value.

2. The method of claim 1 wherein determining the first quality value representing the first signal quality comprises measuring one or a combination of one or more signal quality values selected from a group of signal quality values comprising a signal strength value, a carrier to interference plus noise value, and a channel quality indicator value.

3. The method of claim 1 wherein the subsequent communication is with a selected one of a plurality of base stations and the expected data throughput value is determined by retrieving the stored first data throughput value associated with the stored first signal quality value equal to a current quality value for the selected base station.

4. The method of claim 1 wherein the mobile terminal communicates with a plurality of different sectors of the base station and wherein determining the first quality value, determining the first data throughput value, and storing the first data throughput value in association with the first quality value is performed for each of the plurality of sectors of the base station.

5. The method of claim 4 wherein the subsequent communication is with a selected one of the plurality of sectors of the base station and the expected data throughput value is determined by retrieving the stored first data throughput value associated with the first signal quality value corresponding to a second quality value for the selected sector of the base station.

6. The method of claim 1 wherein the first data throughput value in association with the first quality value is stored in a storage location of the mobile terminal.

7. The method of claim 1 determining that there is congestion at a node between the data source and the base station when the second data throughput value is less than the expected data throughput value when the second data throughput value is less than the expected data throughput value for a time duration threshold.

8. The method of claim 7 wherein the second data throughput value associated with the second signal is determined by using a channel quality indicator (CQI).

9. The method of claim 1 wherein determining that there is congestion at a node between the data source and the base station when the second data throughput value is less than the expected data throughput value includes determining that the second data throughput value is 90 percent or less of the expected data throughput value.

10. The method of claim 1 wherein determining that there is congestion at a node between the data source and the base station when the second data throughput value is less than the expected data throughput value includes determining that the second data throughput value is less than the expected data throughput value for a time period of one second or longer.

11. A method for use in a communication network comprising:
    receiving a data signal transmitted by a base station at a mobile terminal;
    determining a signal quality value of the data signal received by the mobile terminal;
    determining a data throughput value associated with the data signal received by the mobile terminal;
    determining an expected data throughput value for the mobile terminal based on the signal quality value of the data signal received from the base station by examining a historical data throughput value associated with a historical signal quality value of a historical data signal, the historical signal quality value corresponding to the signal quality value of the data signal received by the mobile terminal;
    determining congestion in the communication network when the data throughput value is less than the expected data throughput value,
    wherein the expected data throughput value is a data throughput the mobile terminal is expected to realize with communication with the base station based on the signal quality value of the data signal received by the mobile terminal from the base station; and
    sending a command to the data source to slow down the transfer rate of the data file when the data throughput value is less than the expected data throughput value.

12. The method of claim 11, wherein the mobile terminal determines the expected data throughput value by accessing a table associating a plurality of historical signal quality values with a plurality of historical data throughput values.

13. The method of claim 12, wherein the historical signal quality values are based on historical data signals received by the mobile terminal from the base station and the historical data throughput values are based on data throughput values realized by the mobile terminal for the historical data signals having the historical signal quality values.

14. The method of claim 12, wherein the data throughput value is associated with a radio channel signal quality between the base station and the mobile terminal.

15. The method of claim 11, wherein the data signal transmitted by the base station is based on a data file being transmitted to the mobile terminal by a data source via the base station, the data source being remotely located from the base station and transmitting the data file at a transfer rate.

16. The method of claim 15, wherein the congestion is determined to be at a node between the data source and the base station when the data throughput value is at least 10 percent less than the expected data throughput value.

17. The method of claim 11, wherein the command is sent to the data source when the data throughput value is less than the expected data throughput value for a time duration threshold greater than or equal to 1 second in duration.

* * * * *